United States Patent
Lipson et al.

(10) Patent No.: US 9,746,612 B2
(45) Date of Patent: Aug. 29, 2017

(54) FIBER-WAVEGUIDE EVANESCENT COUPLER

(71) Applicant: Cornell University, Ithaca, NY (US)

(72) Inventors: Michal Lipson, Ithaca, NY (US); Biswajeet Guha, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 14/786,339

(22) PCT Filed: Apr. 21, 2014

(86) PCT No.: PCT/US2014/034834
§ 371 (c)(1),
(2) Date: Oct. 22, 2015

(87) PCT Pub. No.: WO2014/176175
PCT Pub. Date: Oct. 30, 2014

(65) Prior Publication Data
US 2016/0077282 A1  Mar. 17, 2016

Related U.S. Application Data (60) Provisional application No. 61/814,789, filed on Apr. 22, 2013.

(51) Int. Cl.
| | |
|---|---|
| G02B 6/30 | (2006.01) |
| G02B 6/42 | (2006.01) |
| G02B 6/28 | (2006.01) |
| G02B 6/245 | (2006.01) |
| G02B 6/36 | (2006.01) |
| G02B 27/56 | (2006.01) |

(52) U.S. Cl.
CPC ........... G02B 6/30 (2013.01); G02B 6/245 (2013.01); G02B 6/2821 (2013.01); G02B 6/3652 (2013.01); G02B 6/4291 (2013.01); G02B 27/56 (2013.01)

(58) Field of Classification Search
CPC .................................................. G02B 6/30
See application file for complete search history.

(56) References Cited

U.S. PATENT DOCUMENTS

| | | | |
|---|---|---|---|
| 5,533,155 A | 7/1996 | Barberio et al. | |
| 5,703,980 A * | 12/1997 | MacElwee | G02B 6/30 |
| | | | 385/30 |
| 6,625,349 B2 | 9/2003 | Zhao et al. | |
| 2004/0071403 A1 | 4/2004 | Lipson et al. | |
| 2011/0116741 A1 | 5/2011 | Cevini et al. | |

* cited by examiner

Primary Examiner — Omar R Rojas
(74) Attorney, Agent, or Firm — Perkins Coie LLP (57) ABSTRACT

Methods, systems, and devices are disclosed for implementing a fiber-waveguide evanescent coupling. In one aspect, a device having integrated photonic components includes a substrate, a waveguide formed on the substrate to include a terminal waveguide portion that terminates at one side of the substrate, and a fiber including a fiber core and fiber cladding surrounding the fiber core, in which at least a portion of the fiber cladding is removed at or near a fiber terminal end to enable optical evanescent coupling via a side surface of the fiber core at the or near the fiber terminal end, the fiber core at the or near the fiber terminal end is placed over the one side of the substrate to be above and to overlap with the terminal waveguide portion of the waveguide to enable optical evanescent coupling via side surfaces of the fiber core and the waveguide.

5 Claims, 9 Drawing Sheets

FIBER-WAVEGUIDE EVANESCENT COUPLER

PRIORITY CLAIM AND RELATED PATENT APPLICATIONS

This patent document is a 35 USC §371 National Stage application of International Application No. PCT/US2014/034834 filed Apr. 21, 2014, which further claims the benefit of U.S. Provisional Application No. 61/814,789, entitled "FIBER-WAVEGUIDE EVANESCENT COUPLER" and filed on Apr. 22, 2013. The entire content of the aforementioned patent applications are incorporated by reference as part of the disclosure of this patent document.

TECHNICAL FIELD

This patent document relates to optical coupling between a fiber and a waveguide formed on a substrate.

BACKGROUND

Optical communication is a type of communications means that uses light to transfer information between two points over a distance. Historically, some of the earliest forms of optical communications were performed visually, where an optical transmitter emits light as a coded signal, e.g., a sequence of pulses and/or colored light emissions, and is received by a person who visually interprets the coded optical signal to determine the information. Modern optical communications include use of opto-electronic devices where the optical signal is carried over an optical fiber, referred to as fiber-optic communications.

In fiber-optic communications, an optical transmitter is used to convert an electrical signal into an optical signal to send into the optical fiber and received by an optical receiver to recover the optical signal convert back to an electrical signal. For example, the transmission along the optical fiber can include routing through a cable containing bundles of multiple optical fibers and conditioned using multiple kinds of amplifiers. The light is transmitted by the transmitter in the form of an electromagnetic carrier modulated to carry information to the receiver device through the optical fiber. For example, transmitters in optical fiber links can include light-emitting diodes (LEDs) or laser diodes. Infrared light, rather than visible light, is more commonly used in fiber-optic communications, because optical fibers transmit infrared wavelengths with less attenuation and dispersion. In some examples, the optical signal can be encoded using intensity modulation, where in other examples, optical phase and frequency modulation are used to encode the optical signal.

SUMMARY

Techniques, systems, and devices are disclosed for implementing a fiber-waveguide evanescent coupling mechanism.

In one aspect, a device having integrated photonic components includes a substrate, a waveguide formed on the substrate to include a terminal waveguide portion that terminates at one side of the substrate, and a fiber including a fiber core and fiber cladding surrounding the fiber core, in which at least a portion of the fiber cladding is removed at or near a fiber terminal end to enable optical evanescent coupling via a side surface of the fiber core at the or near the fiber terminal end, the fiber core at the or near the fiber terminal end is placed over the one side of the substrate to be above and to overlap with the terminal waveguide portion of the waveguide to enable optical evanescent coupling via side surfaces of the fiber core and the waveguide.

In another aspect, a method for coupling light between a fiber and waveguide on a substrate includes removing at least a portion of fiber cladding at a terminal of a fiber to enable optical evanescent coupling via a side surface of the fiber core at the or near the fiber terminal end; and placing the fiber terminal end over one side of a substrate on which a waveguide is formed to include a terminal waveguide portion that terminates at the one side of the substrate so that the fiber core of the fiber terminal end is above and overlaps with the terminal waveguide portion of the waveguide to enable optical evanescent coupling via side surfaces of the fiber core and the waveguide.

In another aspect, an optical device includes a substrate, a waveguide formed on the substrate to include a terminal waveguide portion that terminates at one side of the substrate, and an optical fiber including a fiber core and fiber cladding surrounding the fiber core, in which at least a portion of the fiber cladding is removed at or near a fiber terminal end of the optical fiber and aligned with the terminal waveguide portion to enable optical evanescent coupling of the optical fiber via a side surface of the fiber core at the or near the fiber terminal end with the waveguide.

In another aspect, an optical device with a stacked optical fiber-waveguide coupling includes a first optical component structured to include a first substrate, a first waveguide formed on the first substrate, and a first lower waveguide cladding formed between the first waveguide and the first substrate. The optical device includes a second optical component structured to include a second substrate, a second waveguide formed on the second substrate and larger than the first waveguide, and a second lower waveguide cladding formed between the second waveguide and the second substrate, the second optical component including a terminal waveguide portion that terminates at one side of the second substrate, in which a portion of the first optical component overlaps over a portion of the second optical component to form an overlapping region to enable optical evanescent coupling between the first and second optical components. The optical device includes a shared waveguide cladding formed between the first and second optical components in the overlapping region, in which the optical evanescent coupling between the first and second optical components occurs at the shared waveguide coupling. And, the optical device includes an optical fiber including a fiber core and fiber cladding surrounding the fiber core, an end of the fiber core exposed at a fiber terminal end, in which the optical fiber is aligned with the terminal waveguide portion to enable optical evanescent coupling of the optical fiber at the fiber terminal end with the waveguide.

Those and other features are described in greater detail in the drawings, the description and the claims.

DETAILED DESCRIPTION

In optical communications and other applications that use fiber for transporting light, coupling light between an optic fiber terminal and an optical waveguide formed on a substrate is needed in various situations, including, for example, directing light from a fiber line to a photonic chip and outputting light from a photonic chip into a fiber line, typically involving fiber-waveguide couplings. One example of existing coupling designs used in some devices and applications is to provide optical coupling between the end facet of an on-chip waveguide and the end facet of the fiber terminal via an optical collimation module between the end waveguide facet and the end facet of the fiber terminal.

In the above end facet coupling, the center of the fiber core is aligned with the center of the waveguide core in most designs to minimize the optical loss at the fiber-waveguide interface. An offset in this optical alignment between the fiber end facet and the end facet of the waveguide along the longitudinal axis of the fiber or waveguide can significantly affect the coupling efficiency. This stringent alignment requirement presents a practical engineering and fabrication difficulty in integrated optics packaging. In various end facet coupling designs, the coupling efficiency tends to be highly sensitive to alignment accuracy in part due to inevitable mismatch between fiber and waveguide optical modes. Some existing packaging methods used in commercial applications require active alignment (e.g., continuous monitoring of optical power), which is expensive and not amenable to mass production while other approaches may involve vertical couplers and complicated lens assembly to increase alignment tolerance. This can drive up the packaging cost which, in many cases, accounts for about 80% of the total cost of an optoelectronic device.

In particular, the engineering problem caused by this stringent alignment requirement is more significant in integrated photonic circuits as the trend for scaling down the integrated optical waveguide dimension continues and a misalignment in the end facet coupling may cause performance degradation or failure of a component.

Fiber-to-waveguide or waveguide-to fiber coupling disclosed herein is based on optical evanescent coupling via a side surface of the optical waveguide and a side surface of the fiber. Different from the above end facet coupling in other fiber-waveguide coupling designs, the disclosed side surface fiber-waveguide coupling can reduce the sensitivity of the coupling efficiency to the optical alignment between the fiber and the waveguide and thus provides large alignment tolerance. In addition, the disclosed fiber-waveguide coupling is relatively simple to implement or fabricate.

Figure 1A:
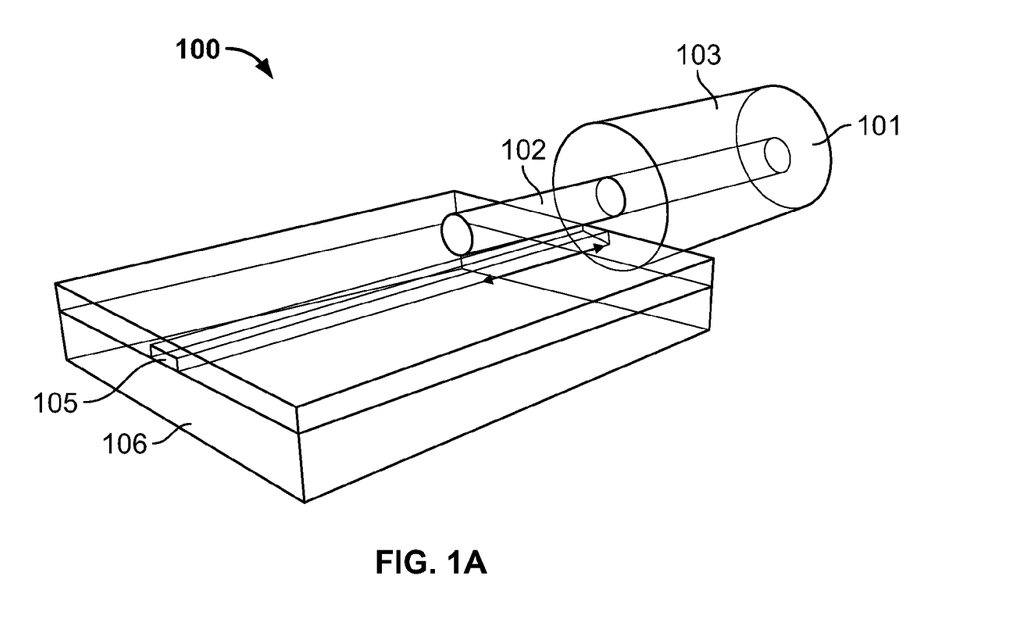
FIGS. 1A-1C show schematic illustrations in three different views of an exemplary embodiment of a fiber-waveguide evanescent coupling mechanism of the disclosed technology.
Figure 1B:
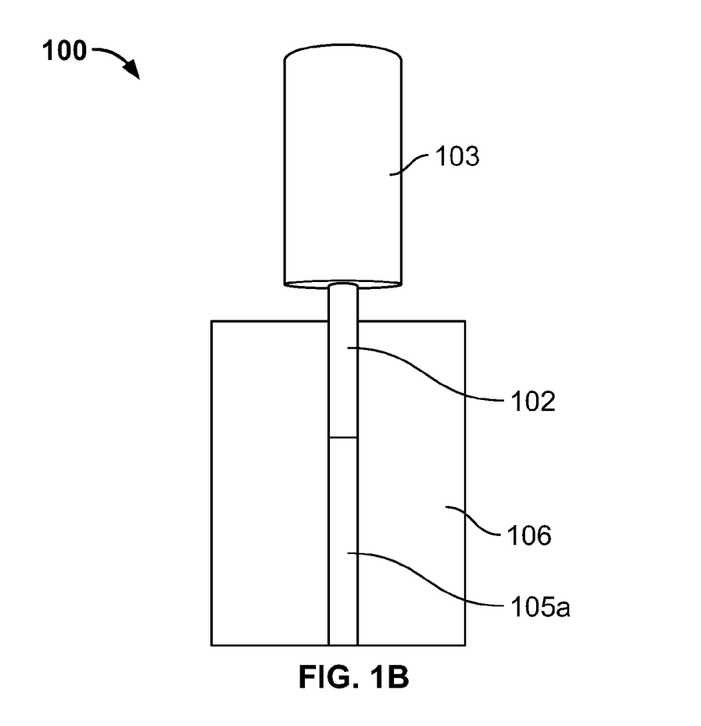
Figure 1C:
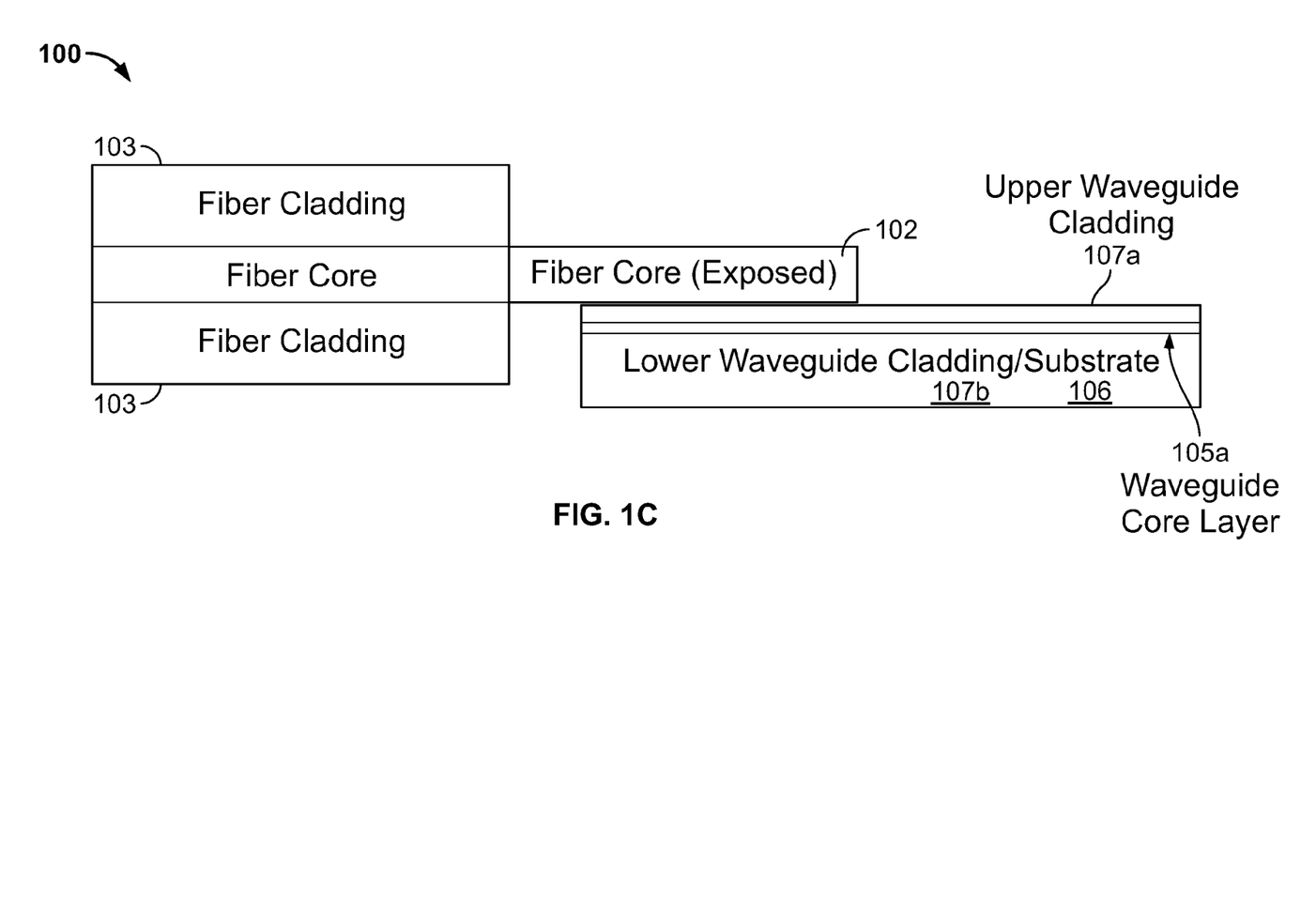

FIGS. 1A-1C show schematic illustrations for implementing an exemplary side surface fiber-waveguide coupling of the disclosed technology. FIG. 1A shows a three-dimensional view of a fiber-waveguide coupling 100 structured to include an optical fiber 101 having a fiber core 102 and fiber cladding 103, in which the optical fiber 101 is coupled with a waveguide 105 formed on a substrate 106. For example, the fiber cladding 103 of the terminal end of a fiber line 101 is removed to expose the fiber core 102, and the exposed fiber core 102 is placed over and is aligned with the waveguide 105 formed on the substrate 106 to have a sufficiently small spacing to effectuate optical evanescent coupling via side surfaces of the waveguide 105 and the exposed fiber core 102. Due to interaction of evanescent optical fields of the waveguide 105 and fiber core 102, power is transferred from the fiber to the waveguide, and vice versa.

FIG. 1B shows a top view illustrating one of multiple relative positions between the exposed fiber core 102 and the waveguide core layer 105a where the exposed fiber core 102 and the waveguide core layer 105a are aligned in their longitudinal axes. In other implementations, for example, the exposed fiber core 102 and the waveguide core layer 105a can be spatially offset so that their longitudinal axes are displaced from each other while remaining being parallel to each other. Such different configurations are possible because of the evanescent coupling via side surfaces of the exposed fiber core 102 and the waveguide core layer 105a. The various configurations of the disclosed fiber-waveguide coupling of the disclosed technology are advantageous in that they enable various alignments of the fiber core 102 with respect to the waveguide 105 to have substantially large tolerances without significantly degrading the coupling efficiency to a unacceptable level. In some implementations, for example, the permissible offset between the fiber core and waveguide core can be more than a few microns, e.g., 2-4 microns, and in some instances, beyond 6 μm.

As shown in the schematic illustration of FIG. 1C, the waveguide 105 on the substrate 106 is formed by a lower waveguide cladding layer 107b formed on the substrate 106, in which the waveguide core layer 105a is formed over the lower waveguide cladding layer 107b and an upper waveguide cladding layer 107a. The exposed fiber core 102 is extended over the upper waveguide cladding layer 107a and is substantially parallel to the waveguide core layer 150a (and for example, can be in contact with the upper waveguide cladding layer 107a, as shown). The thickness of the upper waveguide cladding layer 107a is configured to be sufficiently small to allow optical evanescent coupling between the exposed fiber core 102 and the waveguide core layer 105a. Under this specific configuration, the end facet of the fiber core 102 and the end facet of the waveguide core layer 105a are at different locations and have no optical coupling therebetween. The overlap of the side surfaces of the fiber core 102 and the waveguide core layer 105a along the lengthwise direction of the fiber core 102 and the waveguide core layer 105a provide a side surface coupling region to allows for optical evanescent coupling between the guided light in the fiber core 102 and the guided light in the waveguide core layer 105a. The coupling efficiency of this side surface evanescent coupling is at or near its maximum when the fiber core 102 and the waveguide core layer 105a are parallel and the center of the fiber core 102 and the center of the waveguide core layer 105a are near-aligned to each other along the "vertical direction" that is perpendicular to the substrate surface of the substrate in which the waveguide core layer 105a is formed. A lateral offset between the center of the fiber core 102 and the center of the waveguide core layer 105a in a lateral direction that is perpendicular to the lengthwise direction of the fiber core 102 and the waveguide core layer 105a can reduce the optical coupling efficiency but the reduced amount in the optical coupling efficiency is much less sensitive to the offset when comparing with the end facet coupling configuration.

In practice, the diameter of the fiber core tends to be greater than the width of the waveguide core layer in the plane of the substrate in some device configurations, therefore, the optical modes supported by the fiber core and the waveguide on the substrate are generally different and do not match in their spatial profiles. This mode mismatch tends to cause alignment sensitivity in end-to-end facet coupling between the fiber and the waveguide. The disclosed optical evanescent coupling via side surfaces shown in FIGS. 1A-1C, however, uses the side coupling configuration to reduce the impact of this mode mismatch to the coupling efficiency and improves tolerance to the optical misalignment between the exposed fiber core and the waveguide core layer.

In some implementations, the following exemplary techniques may be used to achieve the coupling depicted in the illustrative schematics of FIGS. 1A-1C. In some examples, the waveguide 105 can be tapered down to appropriate width so that the effective index of the optical mode of the waveguide is same as that of the fiber. In some examples, the waveguide 105 can be cladded with a material having lower refractive index, e.g., such as the upper waveguide cladding layer 107a shown in FIG. 1C.

Figure 2A:
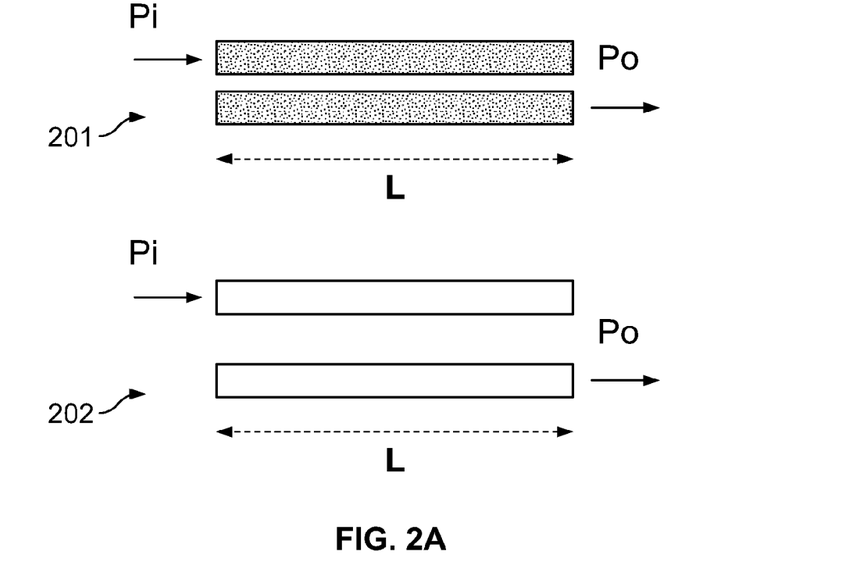
FIG. 2A shows a diagram of exemplary configurations of coupled waveguides with different gaps between the waveguides.
Figure 2B:
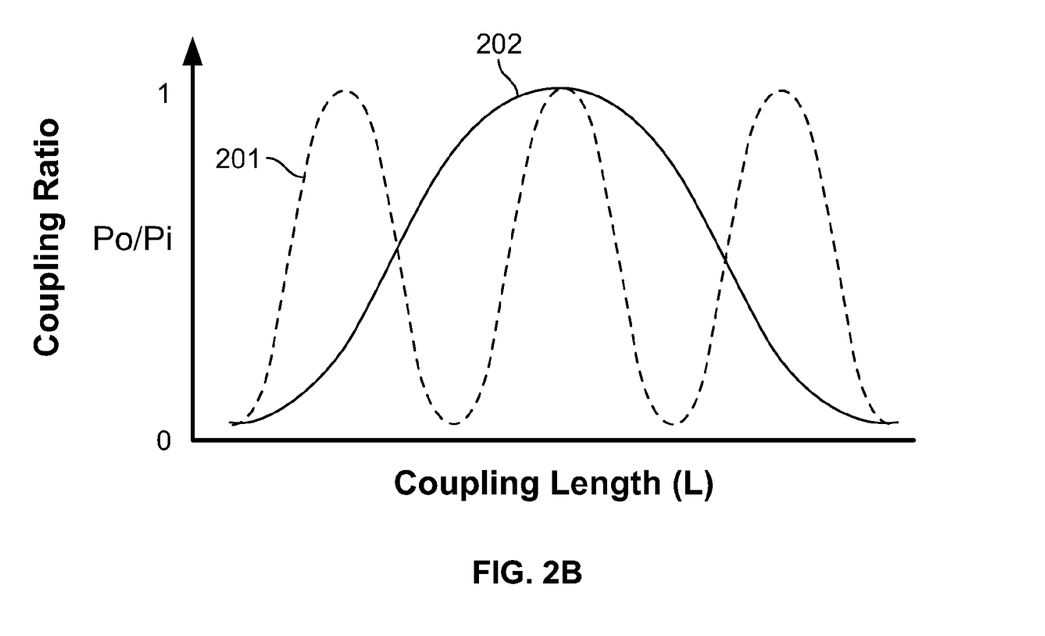
FIG. 2B shows a data plot depicting the ratio of power transferred as a function of coupling length.

FIG. 2A shows a diagram of exemplary configurations 201 and 202 of coupled waveguides with different gaps between the waveguides along coupling length (L). The configuration 201 includes the waveguides coupled by a distance less than the coupling distance of the waveguides in the configuration 202. FIG. 2B shows a data plot depicting the ratio of optical power transferred as a function of the coupling length for the configurations 201 and 202.

FIGS. 2A and 2B illustrates the side surface evanescent optical coupling between two waveguides demonstrating the effects of these exemplary optical couplings, which can be implemented in the exemplary fiber-waveguide coupling shown in FIGS. 1A-1C. The coupling strength depends on the separation and length of the coupling region. The increase in alignment tolerance of this method comes from the fact that in a coupled mode system, where electromagnetic energy oscillates from one guiding layer to another, the characteristic oscillation length increases as the separation between the two guiding layer increases (or coupling strength decreases). If the gap between the guiding structures is large enough (e.g., the waveguide and fiber core are the guiding layers in this exemplary case), optical power oscillates slowly with length, as shown in FIG. 2B. Hence, the coupling strength is relatively insensitive to alignment imperfections.

A comparison between the performance of the exemplary coupling scheme with conventional butt coupling, which is the most commonly adopted coupling scheme, is described. For example, the comparison considers the case of an exemplary optical coupling of an optical fiber to a silicon nitride waveguide. SiN has a refractive index of 2, which is much higher than refractive index of glass (1.46).

Figure 3A:
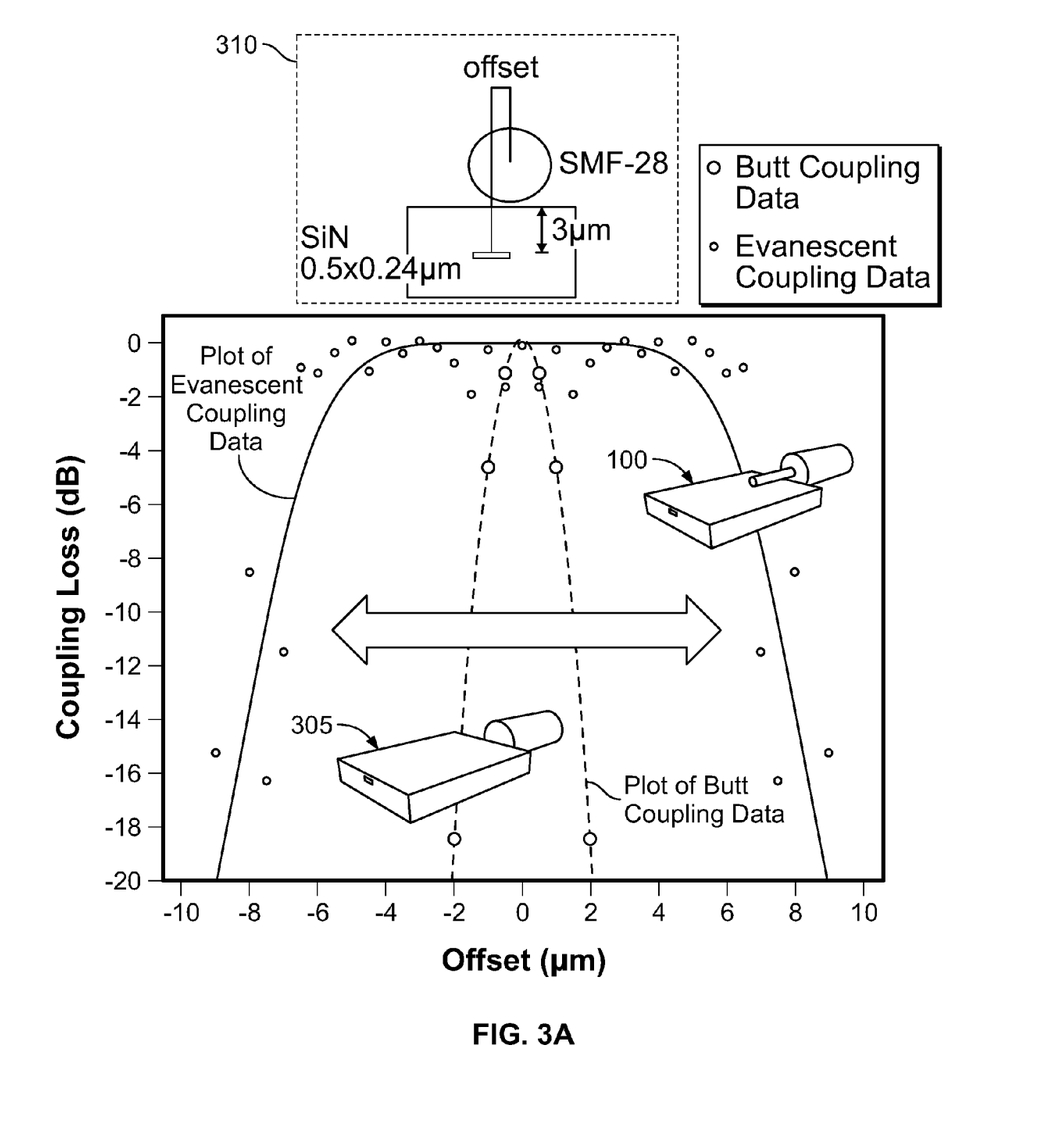
FIGS. 3A and 3B show data plots comparing the fiber placement tolerance in the lateral direction and in the longitudinal direction of an exemplary fiber-waveguide evanescent coupling of the disclosed technology with a conventional butt coupling.
Figure 3B:
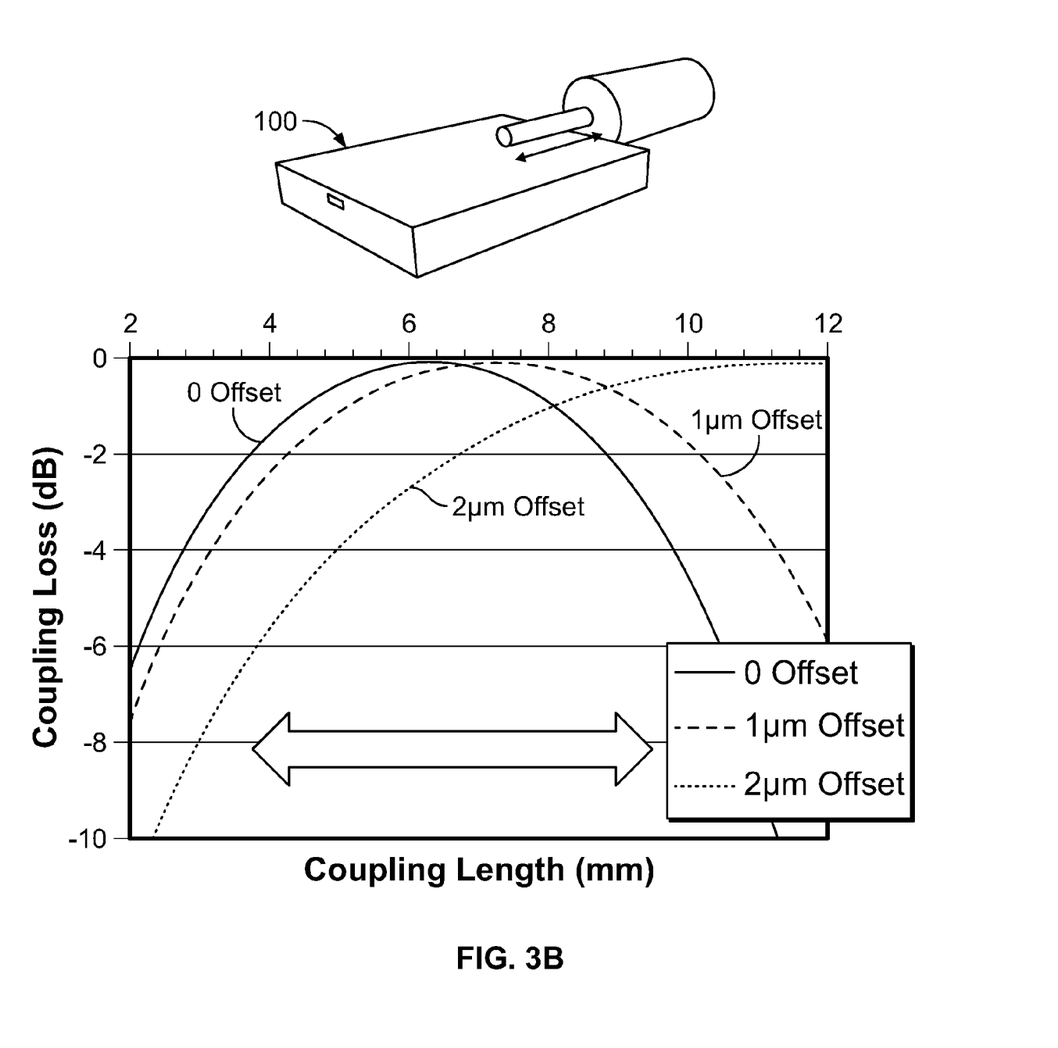

FIGS. 3A and 3B show data plots depicting exemplary results from implementations of an exemplary fiber-waveguide evanescent coupling of the disclosed technology with an exemplary conventional butt coupling to compare the fiber placement tolerance in lateral direction (FIG. 3A) and fiber placement tolerance in longitudinal direction (FIG. 3B). FIG. 3A shows a data plot comparing the alignment tolerance in lateral placement of the fiber (shown as offset) vs. coupling strength (shown as coupling loss) for the exemplary fiber-waveguide evanescent coupling 100 and a conventional butt coupling 305. For example, based on the results of the exemplary implementation, the butt coupling demonstrated a tolerance of <0.5 μm, and the disclosed evanescent coupling scheme demonstrated a tolerance of over 6 μm. In the tested devices shown, the SiN waveguide needs to be tapered down to index match the optical fiber, both for evanescent and butt coupling. The inset 310 of FIG. 3A shows a diagram of the exemplary set-up of the exemplary implementations to compare the exemplary fiber-waveguide evanescent coupling with the conventional butt coupling. The data in FIG. 3A illustrates significant differences in the tolerance of the optical coupling efficiency with respect to the alignment offset. The side surface fiber-waveguide coupling exhibits superior immunity to the alignment offset over the end facet coupling in our tested devices. For example, the optical coupling of the tested device in the side surface fiber-waveguide coupling dropped from its maximum coupling by 10 dB when the lateral alignment offset is slightly above 7 microns. In contrast, a lateral offset of less than 2 microns in the tested device in the end facet coupling would cause a drop of about 10 dB from its maximum optical coupling. Therefore, the different optical coupling properties with respect to the lateral offset in optical alignment can translate into significant differences in performance of the devices.

The alignment tolerance in longitudinal placement of the optical fiber was also analyzed. FIG. 3B shows a data plot comparing the alignment tolerance in longitudinal placement of the fiber (shown as the coupling length) vs. coupling strength (shown as the coupling loss) for the exemplary fiber-waveguide evanescent coupling 100 and a conventional butt coupling 305. In the exemplary implementations, a 3 μm $SiO_2$ cladding was considered between the waveguide and the fiber. For example, it is noted that thicker cladding increases alignment tolerance in all directions, at the expense of requiring longer interaction length. In longitudinal direction, a tolerance of >4 mm was realized, which is more than enough to eliminate the need of any active placement of optical fiber. Moreover, for example, it is noted that the alignment tolerances can even increase for higher index contrast materials, e.g., like Si.

Exemplary Implementations

In implementing the exemplary fiber-waveguide couplings, the exposed terminal portion of the optical fiber core 102 is placed in close proximity to the waveguide 105. For example, the exemplary embodiment of the fiber-waveguide evanescent coupling 100 shows an example where the terminal end portion of the fiber core is complexly exposed by stripping off the fiber cladding.

In other implementations, for example, the core of the optical fiber need not be fully exposed, but the cladding needs to be sufficiently removed to have access to the evanescent field of the optical mode. For example, this can be achieved either by partial etching of the cladding, or preparing specialized fiber facets (e.g., like D-shaped fiber) where the core is very close to the facet, or by other configurations described below. FIGS. 4A-4C and FIGS. 5A-5C show illustrative schematics of other exemplary embodiments of the disclosed fiber-waveguide evanescent coupling.

Figure 4A:
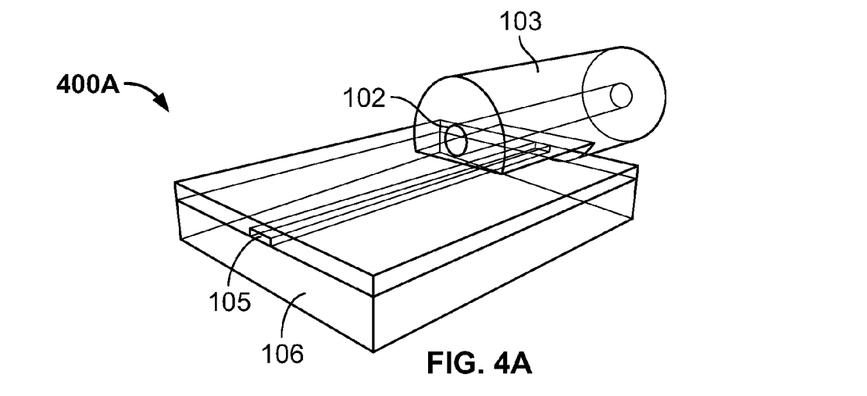
FIGS. 4A-4C show illustrative schematics of other exemplary embodiments of the disclosed fiber-waveguide evanescent coupling.
Figure 5A:
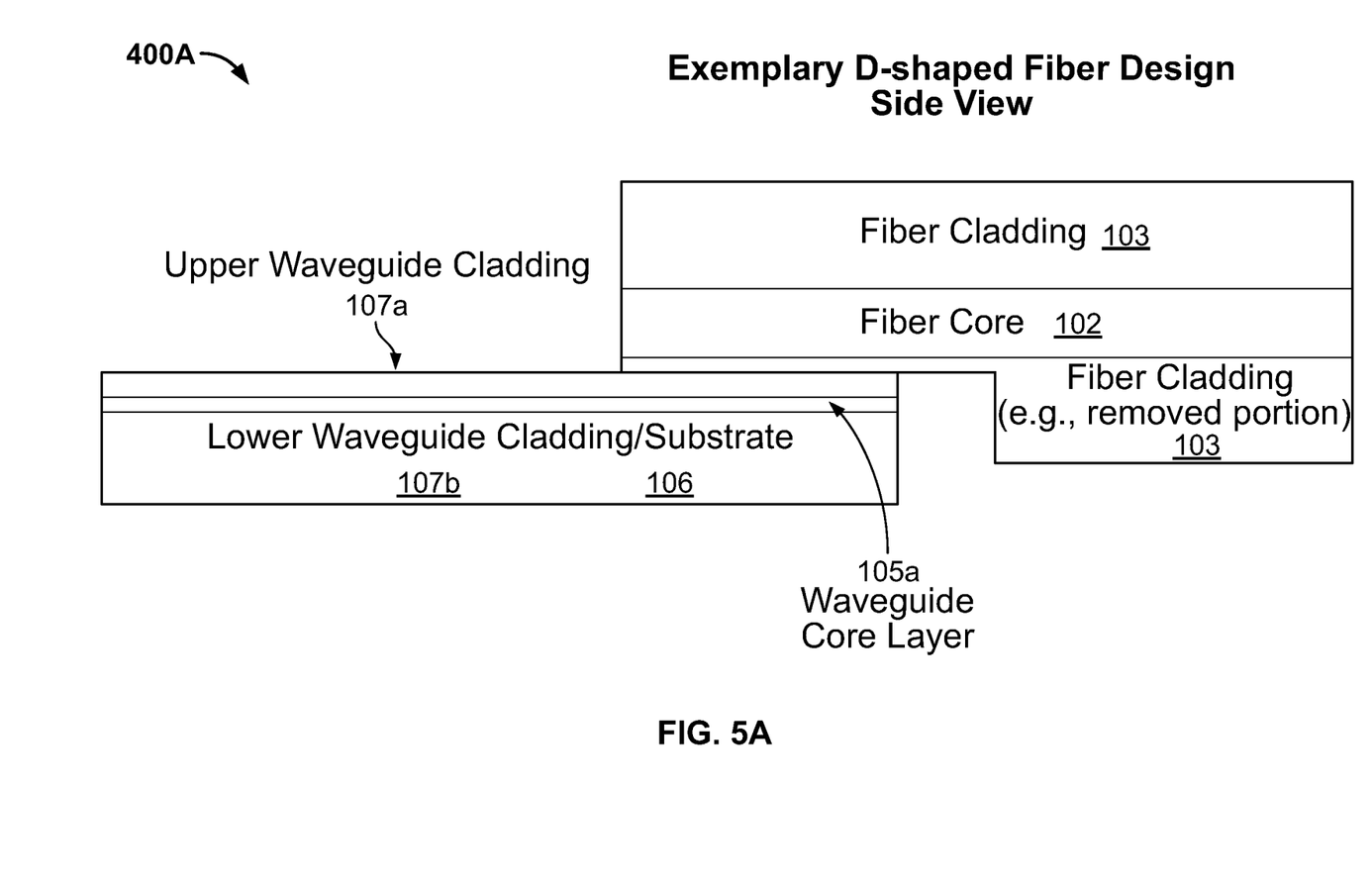
FIGS. 5A-5C show side view schematic diagrams of the exemplary structures in FIGS. 4A-4C, respectively.

FIG. 4A shows a three-dimensional view of an illustrative schematic of a fiber-waveguide evanescent coupling 400A having a partially exposed fiber core terminal portion in a D-shaped fiber. The fiber-waveguide coupling 400A is structured to include an optical fiber having a fiber core 102 and fiber cladding 103, in which a lower portion of the fiber cladding 103 is removed at the terminal end of the optical fiber that couples with the waveguide 105 formed on the substrate 106. For example, the fiber cladding 103 of the terminal end of the optical fiber is removed to expose the fiber core 102, such that the exposed fiber core 102 is placed into the groove formed on the upper waveguide cladding 107*a* aligned with the waveguide core layer 105*a* over the lower waveguide cladding 107*b* on the substrate 106. The groove can provide a structural feature to enable ease of alignment of the optical fiber with the waveguide while also facilitating a sufficiently small spacing to effectuate optical evanescent coupling via side surfaces of the waveguide 105 and the exposed fiber core 102. Due to interaction of evanescent optical fields of the waveguide 105 and fiber core 102, light is transferred from the fiber to the waveguide, and vice versa. FIG. 5A shows a side view of the exemplary design of the fiber-waveguide evanescent coupling in FIG. 4A.

Figure 4B:
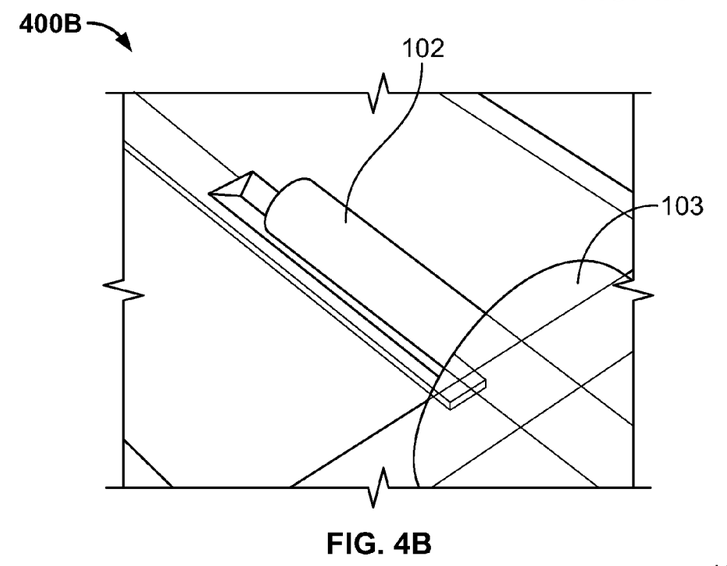
Figure 5B:
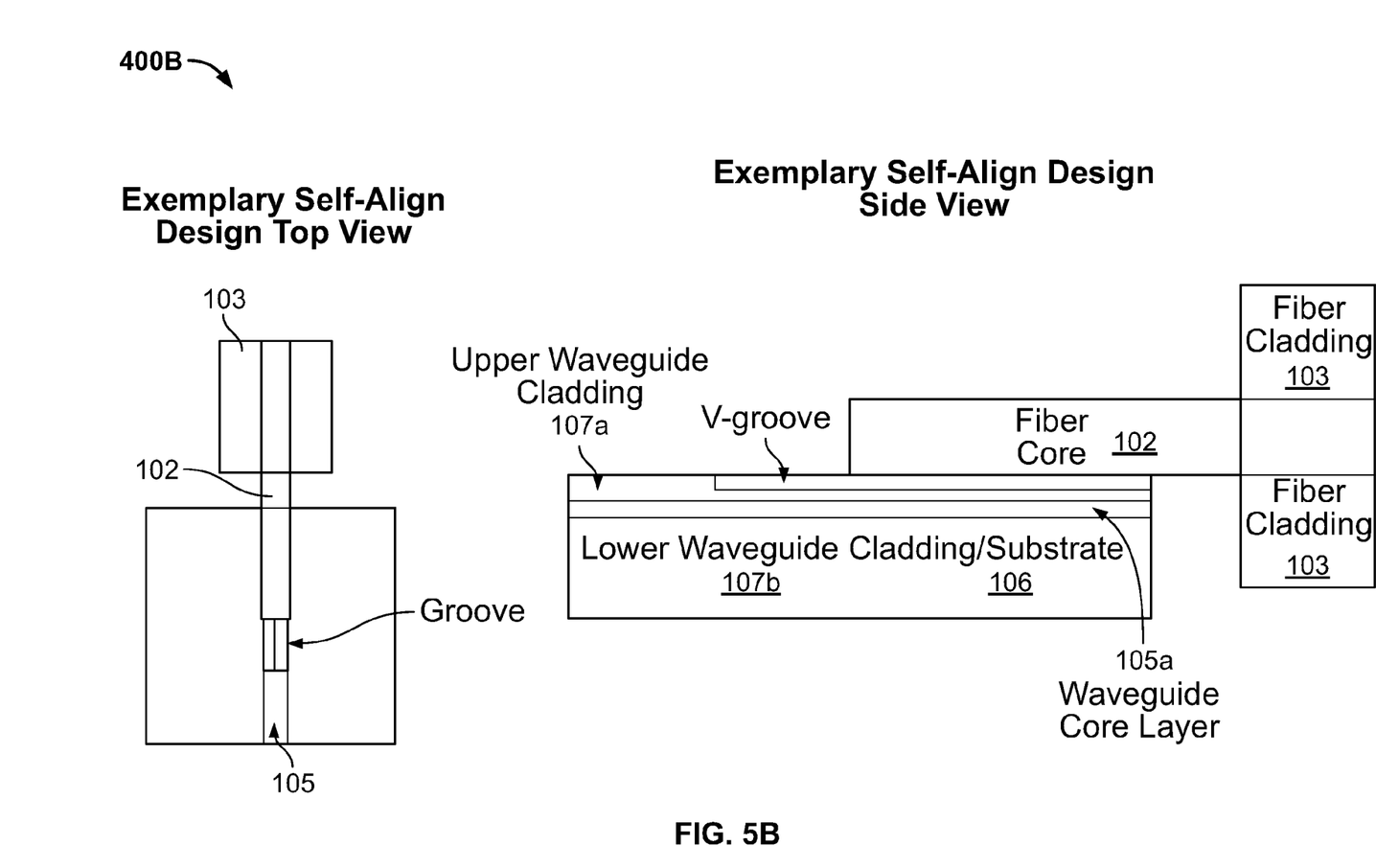

FIG. 4B shows a three-dimensional view of an illustrative schematic of a fiber-waveguide evanescent coupling 400B in which the optical fiber can be self-aligned to the underlying waveguide using a groove, e.g., a V-shaped groove. The fiber-waveguide coupling 400B is structured to include an optical fiber having a fiber core 102 and fiber cladding 103 that is optically coupled to the waveguide 105 formed on the substrate 106 by self-aligning within a groove. For example, the shape of the optical fiber of coupling 400A allows the exposed fiber core 102 to be placed over and is aligned with the waveguide 105 over the substrate 106 to have a sufficiently small spacing to effectuate optical evanescent coupling via side surfaces of the waveguide 105 on the substrate 105 and the exposed fiber core 102. Due to interaction of evanescent optical fields of the waveguide 105 and fiber core 102, power is transferred from the fiber to the waveguide, and vice versa. FIG. 5B shows a top view and a side view of the exemplary design of the fiber-waveguide evanescent coupling in FIG. 4B.

Figure 4C:
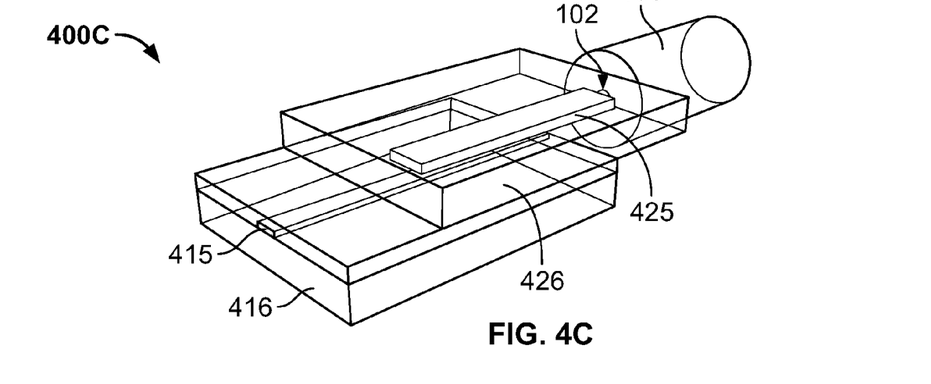
Figure 5C:
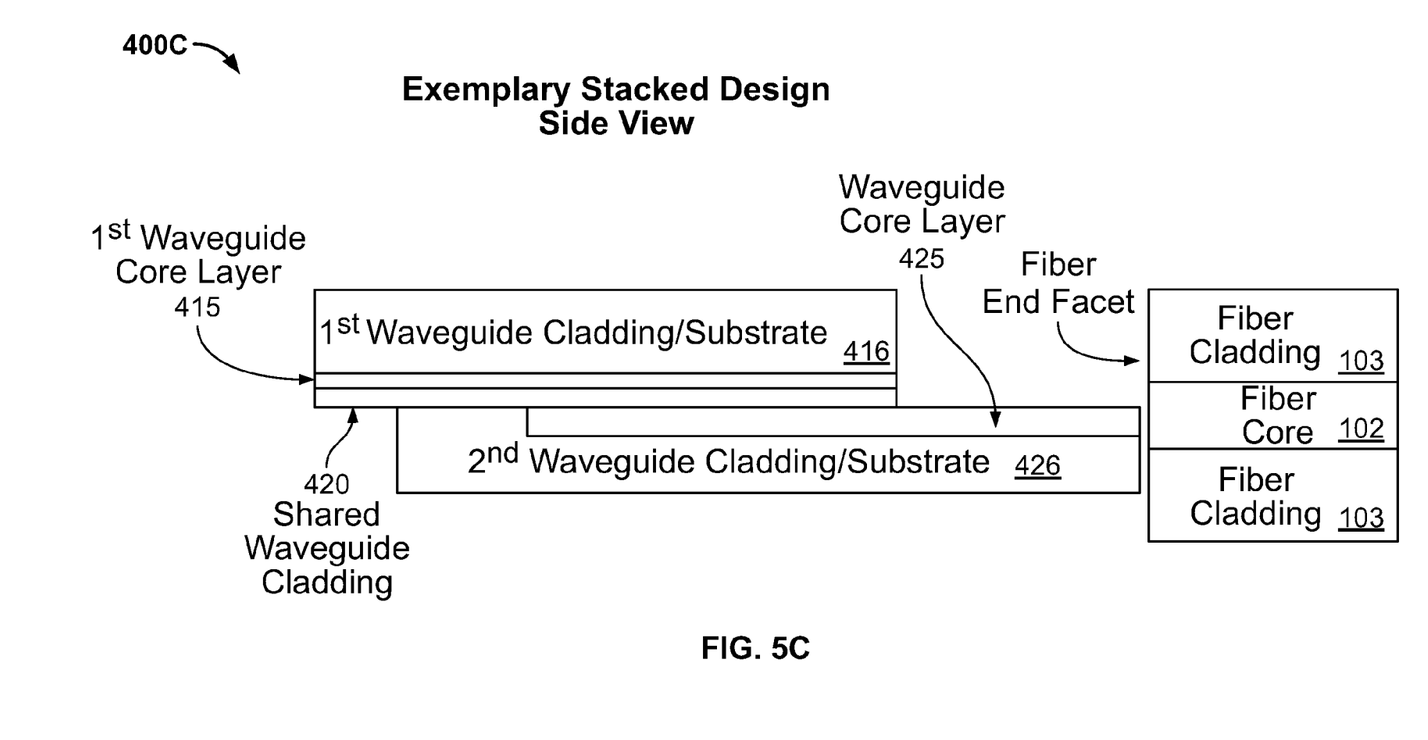

FIG. 4C shows a three-dimensional view of an illustrative schematic of a fiber-waveguide evanescent coupling 400C having stacked coupling configuration using an intermediate waveguide. For example, the exemplary stacked coupling configuration of the fiber-waveguide evanescent coupling 400C includes a side surface evanescent coupling of the fiber core 102 with a larger waveguide as an intermediate waveguide 425. For example, the stacked coupling configuration is formed by stacking a first waveguide 415 (formed on a substrate 416) in a stacked chip design with the larger intermediate waveguide 425 (formed on the substrate 426), which is coupled to the fiber core 102 via an end facet coupling. For example, the underlying waveguide 415 is vertically coupled to a large low index contrast waveguide 425 on top via a shared waveguide cladding 420. The optical fiber can be coupled to this low index contrast waveguide 425 using any mechanism, for example, since its alignment tolerance is relatively large because of the large cross-section of the waveguide 425. FIG. 5C shows a side view of the exemplary design of the fiber-waveguide evanescent coupling in FIG. 4C.

These exemplary fiber-waveguide coupling designs shown in FIGS. 4A-4C and 5A-5C can also improve tolerance to fiber misalignment, enhance optical coupling efficiency, and can reduce the cost of optoelectronic packaging.

EXAMPLES

The following examples are illustrative of several embodiments of the present technology. Other exemplary embodiments of the present technology may be presented prior to the following listed examples, or after the following listed examples.

In one example of the present technology (example 1), a device having integrated photonic components includes a substrate, a waveguide formed on the substrate to include a terminal waveguide portion that terminates at one side of the substrate, and an optical fiber including a fiber core and fiber cladding surrounding the fiber core, in which at least a portion of the fiber cladding is removed at or near a fiber terminal end of the optical fiber to enable optical evanescent coupling via a side surface of the fiber core at the or near the fiber terminal end, in which the fiber core at the or near the fiber terminal end is placed over the one side of the substrate to be above and to overlap with the terminal waveguide portion of the waveguide to enable optical evanescent coupling via side surfaces of the fiber core and the waveguide.

Example 2 includes the device as in example 1, in which the fiber is shifted in position relative to the waveguide along a direction that is perpendicular to a longitudinal direction of the waveguide or the fiber.

Example 3 includes the device as in example 1, further including a low index waveguide cladding layer formed between the fiber and the waveguide.

In one example of the present technology (example 4), a method for coupling light between a fiber and waveguide on a substrate includes removing at least a portion of fiber cladding at a terminal end of an optical fiber to enable optical evanescent coupling via a side surface of a fiber core of the optical fiber at the or near the terminal end; and placing the terminal end over one side of a substrate on which a waveguide is formed to include a terminal waveguide portion that terminates at the one side of the substrate so that the fiber core of the terminal end is above and overlaps with the terminal waveguide portion of the waveguide to enable optical evanescent coupling via side surfaces of the fiber core and the waveguide.

Example 5 includes the method as in example 4, in which the placing includes aligning the optical fiber with the waveguide with an alignment tolerance of at least 6 µm to produce a maximum optical evanescent coupling power.

Example 6 includes the method as in example 4, in which the placing includes aligning the optical fiber with the waveguide with an alignment tolerance of at least 4 mm to produce a maximum optical evanescent coupling power.

Example 7 includes the method as in example 4, in which the placing includes aligning the optical fiber is placed over a groove formed over at least a portion of the terminal waveguide portion of the waveguide.

In one example of the present technology (example 8), an optical device includes a substrate, a waveguide formed on the substrate to include a terminal waveguide portion that terminates at one side of the substrate, and an optical fiber including a fiber core and fiber cladding surrounding the fiber core, in which at least a portion of the fiber cladding is removed at or near a fiber terminal end of the optical fiber and aligned with the terminal waveguide portion to enable optical evanescent coupling of the optical fiber via a side surface of the fiber core at the or near the fiber terminal end with the waveguide.

Example 9 includes the device as in example 8, in which the fiber core at the or near the fiber terminal end is placed over the one side of the substrate to be above and to overlap with the terminal waveguide portion of the waveguide.

Example 10 includes the device as in example 9, in which the waveguide includes an upper waveguide cladding and a lower waveguide cladding surrounding the waveguide, the lower waveguide cladding formed between the waveguide and the substrate.

Example 11 includes the device as in example 10, in which the optical evanescent coupling occurs at the upper waveguide cladding.

Example 12 includes the device as in example 8, in which a latitudinal alignment of the optical fiber with the waveguide includes an alignment tolerance of at least 6 µm to produce a maximum optical evanescent coupling power.

Example 13 includes the device as in example 8, in which a longitudinal alignment of the optical fiber with the waveguide includes an alignment tolerance of at least 4 mm to produce a maximum optical evanescent coupling power.

Example 14 includes the device as in example 8, in which the portion of the fiber cladding removed at the or near the fiber terminal end of the optical fiber is removed at one side of the fiber cladding, in which a portion of the fiber core at the removed side of the fiber cladding is placed over the one side of the substrate to be above and to overlap with the terminal waveguide portion of the waveguide.

Example 15 includes the device as in example 11, in which the upper waveguide cladding includes a groove over at least a portion of the upper waveguide cladding, and in which the fiber core at the or near the fiber terminal end is placed over the groove to be above and to overlap with the terminal waveguide portion of the waveguide.

In one example of the present technology (example 16), an optical device with a stacked optical fiber-waveguide coupling includes a first optical component structured to include a first substrate, a first waveguide formed on the first substrate, and a first lower waveguide cladding formed between the first waveguide and the first substrate. The optical device includes a second optical component structured to include a second substrate, a second waveguide formed on the second substrate and larger than the first waveguide, and a second lower waveguide cladding formed between the second waveguide and the second substrate, the second optical component including a terminal waveguide portion that terminates at one side of the second substrate, in which a portion of the first optical component overlaps over a portion of the second optical component to form an overlapping region to enable optical evanescent coupling between the first and second optical components. The optical device includes a shared waveguide cladding formed between the first and second optical components in the overlapping region, in which the optical evanescent coupling between the first and second optical components occurs at the shared waveguide coupling. And, the optical device includes an optical fiber including a fiber core and fiber cladding surrounding the fiber core, an end of the fiber core exposed at a fiber terminal end, in which the optical fiber is aligned with the terminal waveguide portion to enable optical evanescent coupling of the optical fiber at the fiber terminal end with the waveguide.

Additional Examples

In one aspect, a device having integrated photonic components includes a substrate, a waveguide formed on the substrate to include a terminal waveguide portion that terminates at one side of the substrate, and a fiber including a fiber core and fiber cladding surrounding the fiber core, in which at least a portion of the fiber cladding is removed at or near a fiber terminal end to enable optical evanescent coupling via a side surface of the fiber core at the or near the fiber terminal end, the fiber core at the or near the fiber terminal end is placed over the one side of the substrate to be above and to overlap with the terminal waveguide portion of the waveguide to enable optical evanescent coupling via side surfaces of the fiber core and the waveguide.

Implementations of the device can include one or more of the following exemplary features. In some implementations, for example, the fiber can be shifted in position relative to the waveguide along a direction that is perpendicular to a longitudinal direction of the waveguide or the fiber. For example, in some implementations, the device can further include a low index waveguide cladding layer formed between the fiber and the waveguide.

In another aspect, a method for coupling light between a fiber and waveguide on a substrate includes removing at least a portion of fiber cladding at a terminal of a fiber to enable optical evanescent coupling via a side surface of the fiber core at the or near the fiber terminal end; and placing the fiber terminal end over one side of a substrate on which a waveguide is formed to include a terminal waveguide portion that terminates at the one side of the substrate so that the fiber core of the fiber terminal end is above and overlaps with the terminal waveguide portion of the waveguide to enable optical evanescent coupling via side surfaces of the fiber core and the waveguide.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Only a few implementations and examples are described and other implementations, enhancements and variations can be made based on what is described and illustrated in this patent document.

What is claimed is:

1. A device having integrated photonic components, comprising:
   a substrate;
   a waveguide formed on the substrate to include a terminal waveguide portion that terminates at one side of the substrate; and
   an optical fiber including a fiber core and fiber cladding surrounding the fiber core, wherein at least a portion of the fiber cladding is removed at or near a fiber terminal end of the optical fiber to enable optical evanescent coupling via a side surface of the fiber core at the or near the fiber terminal end, wherein the fiber core at the or near the fiber terminal end is placed over the one side of the substrate to be above and to overlap with the terminal waveguide portion of the waveguide to enable optical evanescent coupling via side surfaces of the fiber core and the waveguide;

wherein the optical fiber is placed over a groove formed over at least a portion of the terminal waveguide portion of the waveguide.

2. The device as in claim 1, further comprising:

a waveguide cladding layer formed between the fiber and the waveguide.

3. A method for coupling light between a fiber and waveguide on a substrate, comprising:

removing at least a portion of fiber cladding at a terminal end of an optical fiber to enable optical evanescent coupling via a side surface of a fiber core of the optical fiber at the or near the terminal end; and placing the terminal end over one side of a substrate on which a waveguide is formed to include a terminal waveguide portion that terminates at the one side of the substrate so that the fiber core of the terminal end is above and overlaps with the terminal waveguide portion of the waveguide to enable optical evanescent coupling via side surfaces of the fiber core and the waveguide;

wherein the placing includes aligning the optical fiber by placing over a groove formed over at least a portion of the terminal waveguide portion of the waveguide.

4. The method as in claim 3, wherein the placing includes aligning the optical fiber with the waveguide with an alignment tolerance of at least 6 μm to produce a maximum optical evanescent coupling power.

5. The method as in claim 3, wherein the placing includes aligning the optical fiber with the waveguide with an alignment tolerance of at least 4 mm to produce a maximum optical evanescent coupling power.

* * * * *